Aug. 7, 1928.

F. L. CONE

STOCK PUSHER

Filed July 14, 1923

1,679,515

Inventor
Frank L. Cone
by Brown Quinby & Kay
Attys

Patented Aug. 7, 1928.

1,679,515

UNITED STATES PATENT OFFICE.

FRANK L. CONE, OF WINDSOR, VERMONT.

STOCK PUSHER.

Application filed July 14, 1923. Serial No. 651,527.

This invention relates to stock pushers such as are used to feed stock in automatic lathes, screw machines and the like and comprises a plurality of stock-engaging jaws which are held in assembled relation entirely by the use of embracing springs which also cause the jaws to engage the stock. One of these jaws may be formed integral with a sleeve to which connection may be made for moving both to feed the stock.

For a more complete understanding of this invention reference may be made to the accompanying drawings in which Figure 1 is a side elevation of the pusher.

Figure 2:
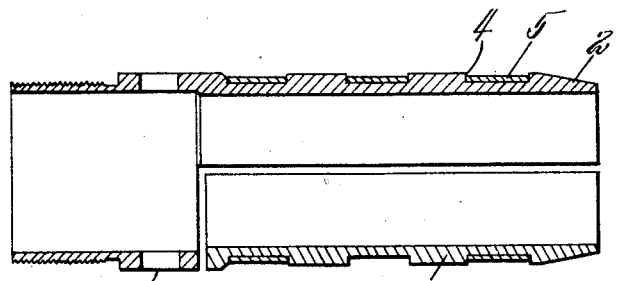
Figure 2 is a central longitudinal section through the device on line 2—2 of Figure 1.
Figure 1:
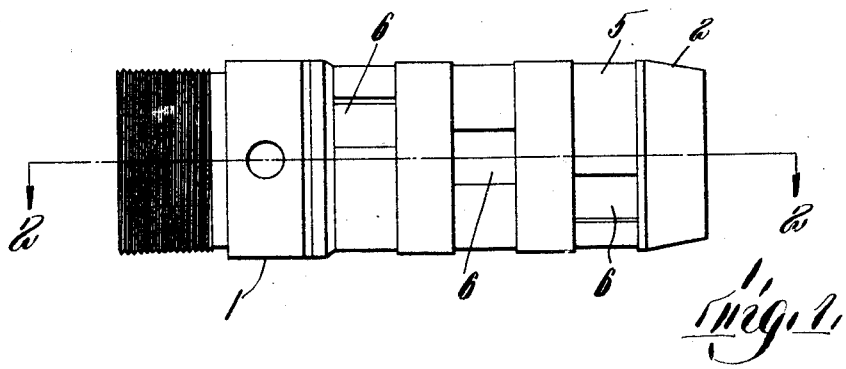
Figure 3:
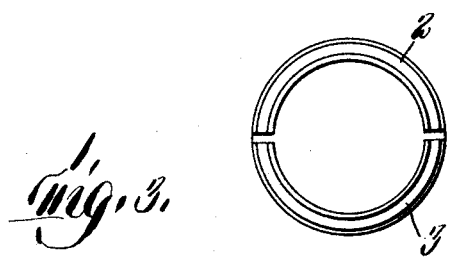
Figure 3 is an end view.

Referring to these figures, at 1 is indicated a sleeve having an end portion cut away by a right angle cut to form a jaw 2 integral with the main portion of the sleeve and extending from one end thereof and a mating jaw 3 formed to loosely engage within this cut out portion. The jaws when in assembled relation have annular portions 4 of reduced external diameter, each forming a seat for the reception of a clamping spring 5. Each spring is formed ring shaped, being split or cut through as at 6, so that the jaws may be sprung apart in opposition to the tension exerted by these springs. The springs and the annular portions 4 form interengaging elements which prevent the disassembly of the jaws either by relative axial or lateral movements thereof. These springs also serve to urge the jaws toward each other to bring their inner faces in contact with the stock to be fed which passes through the sleeve 1 in a well understood manner. While as shown two segmental jaws only and three springs are employed, it is evident that more than two jaws might be employed as well as one or more springs if desired, one or more of the jaws being integral with the sleeve 1 and one or more jaws being separate and held in assembled relation with the cooperating jaw or jaws by means of one or more springs 5.

It should be noted that the jaws are formed by cutting a sleeve, uncut portions forming certain of the stock-clamping jaws and the cut out piece or pieces forming co-operating jaws which are held in cooperative relation to the uncut portions by the springs which clamp them to the stock. The internal and external configuration of the parts including the various portions 4 of reduced diameter for the springs are seated may be formed in a lathe, before the jaws are cut so that the operation of forming the device is simple and little waste is produced.

Having thus described an embodiment of this invention it should be evident to those skilled in the art that many changes and modifications may be made therein without departing from its spirit or scope as defined by the appended claims.

I claim:

1. A stock pusher comprising a sleeve cut away at one end to form a segmental stock-clamping jaw, a segmental jaw fitting said cut away portion, and one or more spring rings embracing said jaws.

2. A stock pusher comprising a sleeve cut away at one end to form a segmental stock-clamping jaw, a segmental jaw fitting said cut away portion, and one or more spring rings embracing said jaws, said jaws having peripheral grooves to receive said spring rings, whereby said rings act both to hold said jaws assembled and to press them against stock passing through said sleeve.

3. A stock pusher comprising an actuating portion, a segmental jaw portion projecting from said actuating portion, a loose segmental jaw cooperating with said jaw portion to clamp stock extending therebetween, and means for holding said jaw and jaw portion in assembled relation.

4. A stock pusher comprising an actuating portion, a segmental jaw portion projecting from said actuating portion, a loose segmental jaw cooperating with said jaw portion to clamp stock extending therebetween, and a spring ring surrounding said jaw and jaw portion and holding them in assembled relation and in clamping relation to the stock.

In testimony whereof I have affixed my signature.

FRANK L. CONE.